(12) United States Patent
Suzuki et al.

(10) Patent No.: US 7,208,229 B2
(45) Date of Patent: Apr. 24, 2007

(54) MODIFIED METAL OXIDE SOL, COATING COMPOSITIONS AND OPTICAL ELEMENT

(75) Inventors: Keitaro Suzuki, Chiba (JP); Yoshinari Koyama, Chiba (JP); Motoko Iijima, Chiba (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 363 days.

(21) Appl. No.: 10/603,011

(22) Filed: Jun. 25, 2003

(65) Prior Publication Data

US 2004/0086724 A1 May 6, 2004

Related U.S. Application Data

(62) Division of application No. 09/637,029, filed on Aug. 14, 2000, now Pat. No. 6,626,987.

(30) Foreign Application Priority Data

Aug. 16, 1999 (JP) ................... 11-229842
Aug. 16, 1999 (JP) ................... 11-229843

(51) Int. Cl.
*B23B 9/04* (2006.01)
*B01F 3/12* (2006.01)
*C09D 1/00* (2006.01)

(52) U.S. Cl. ................. 428/447; 428/429; 106/287.14; 106/286.2

(58) Field of Classification Search .......... 106/287.14, 106/286.2; 516/36, 90, 91, 92, 95; 523/212, 523/213; 524/401, 408; 428/429, 447; 252/582
See application file for complete search history.

(56) References Cited

U.S. PATENT DOCUMENTS

| | | | |
|---|---|---|---|
| 4,589,997 A | 5/1986 | Watanabe et al. | 516/91 |
| 4,731,198 A | 3/1988 | Watanabe et al. | 516/91 |
| 4,770,813 A | 9/1988 | Watanabe et al. | 516/36 |
| 5,094,691 A | 3/1992 | Watanabe et al. | 106/286.4 |
| 5,124,207 A | 6/1992 | Hayashi et al. | 428/404 |
| 5,415,690 A | 5/1995 | Watanabe | 106/287.12 |
| 5,460,738 A | 10/1995 | Watanabe et al. | 516/90 |
| 5,472,797 A | 12/1995 | Yajima et al. | 106/286.4 |
| 5,891,362 A | 4/1999 | Watanabe et al. | 516/88 |
| 6,296,943 B1 | 10/2001 | Watanabe et al. | 516/90 |
| 6,355,694 B1 | 3/2002 | Suzuki et al. | 516/90 |
| 2006/0025518 A1* | 2/2006 | Koyama et al. | 524/588 |

FOREIGN PATENT DOCUMENTS

| | | |
|---|---|---|
| EP | 0 574 274 | 12/1993 |
| EP | 0 379 343 | 7/1998 |
| EP | 0 909 784 | 4/1999 |
| GB | 2 320 019 | 6/1998 |
| JP | 06-329988 | 11/1994 |
| WO | WO 98/39253 | * 9/1998 |

OTHER PUBLICATIONS

Derwent Abstract on EAST, Week 199505, London: Derwent Publications, Ltd., AN 1995-049066, Class A82, JP 06329988 A (NIKON Corp) abstract.
Machine translation of JP 06-329988, Japanese Patent Office, http://www6.ipdl.jpo.go.jp/Tokujitu/PAJdetail.ipdl?N0000+60&N0120+01&N2001+2&N3001+H06-329988, date Mar. 2002.

* cited by examiner

*Primary Examiner*—Daniel S. Metzmaier
(74) *Attorney, Agent, or Firm*—Oblon, Spivak, McClelland, Maier & Neustadt, P.C.

(57) ABSTRACT

A stable modified metal oxide sol which contains from 2 to 50 wt %, as calculated as metal oxides, of particles (c) comprising colloidal particles (a) of a metal oxide having primary particle diameters of from 2 to 60 nm, as nuclei, and a coating material (b) consisting of colloidal particles of an acidic oxide coated on the surface of the particles (a), and which has primary particle diameters of from 2 to 100 nm.

6 Claims, No Drawings

MODIFIED METAL OXIDE SOL, COATING COMPOSITIONS AND OPTICAL ELEMENT

This application is a division of application Ser. No. 09/637,029, filed Aug. 14, 2000, now U.S. Pat. No. 6,626,987.

BACKGROUND OF THE INVENTION

1. Field of the Invention

The present invention relates to a stable modified metal oxide sol which contains particles comprising colloidal particles of a metal oxide as nuclei and a coating material consisting of an alkali salt of an acidic oxide, colloidal particles of an acidic oxide or a mixture thereof, coated on the surface of the colloidal particles as nuclei, and a process for producing it.

The colloid of the present invention is useful as a component for a hard coating agent to be applied to the surface of plastic lenses.

Further, the present invention relates to a coating composition which provides a coating film having excellent warm water resistance and having no decrease in weather resistance and light resistance even when a vapor deposition film (such as an antireflection film) of an inorganic oxide is provided on the coating film, and an optical element employing the coating composition.

2. Discussion of the Background

In order to improve the surface of plastic lenses which became used widely in recent years, as a component for a hard coating agent to be applied to said surface, sols of a metal oxide having a high refractive index and having a good compatibility with the hard coating agent have been used.

For example, a stable sol of tungstic oxide alone has not been known yet, but a sol having a $WO_3:SiO_2:M_2O$ molar ratio (wherein M is an alkali metal atom or an ammonium group) of 4 to 15:2 to 5:1, obtained by addition of a silicate, has been proposed in JP-A-54-52686.

JP-B-50-40119 proposes a silicate-stanate composite sol having a molar ratio of Si:Sn of 2 to 1000:1.

JP-B-63-37142 discloses a hard coating agent which contains particles of an oxide of a metal such as Al, Ti, Zr, Sn or Sb, having particle diameters of from 1 to 300 nm.

Further, JP-A-3-217230 proposes a stable sol containing colloidal particles of a modified metal oxide having particle diameters of from 4.5 to 60 nm, which comprise colloidal particles of an oxide of a metal with a valence of 3, 4 or 5, having particle diameters of from 4 to 50 nm, as nuclei, and colloidal particles of a tungstic oxide-stannic oxide composite having a $WO_3/SnO_2$ weight ratio of from 0.5 to 100 and having particle diameters of from 2 to 7 nm, coated on the surface of the colloidal particles as nuclei, wherein the content of the total metal oxides is from 2 to 50 wt %.

Further, JP-A-6-24746 proposes a stable sol of a modified $SnO_2$—$ZrO_2$ composite which contains particles comprising colloidal particles of a $SnO_2$—$ZrO_2$ composite having a weight ratio of $ZrO_2/SnO_2$ of from 0.02 to 1.0 and having particle diameters of from 4 to 50 nm, as nuclei, and colloidal particles of a $WO_3$—$SnO_2$ composite having a $WO_3/SnO_2$ weight ratio of from 0.5 to 100 and having particle diameters of from 2 to 7 nm, coated on the surface of the colloidal particles as nuclei.

Still further, JP-A-10-310429 proposes a stable sol of a $TiO_2$—$ZrO_2$—$SnO_2$ composite oxide.

Plastic molded products are used in a large quantity by virtue of their advantageous features such as light weight, good processability and high impact resistance. On the other hand, they have drawbacks that the hardness is inadequate, and thus they are susceptible to scratching, they are likely to be eroded by a solvent, they are likely to be electrified and adsorb a dust, and the heat resistance is inadequate. Thus, as compared with inorganic glass molded products, they were practically inferior for use as lenses for eyeglasses or window materials. Accordingly, it has been proposed to apply a protective coating to a plastic molded product. Many compositions have been proposed as coating compositions to be used for such a protective coating. For example, JP-A-52-11261 proposes to use "a coating composition containing an organic silicon compound or its hydrolyzate as the main component (resin component or coating film-forming component)" for eyeglass lenses, which was expected to provide a coating film as hard as an inorganic product. However, this coating composition still does not provide adequate scratch resistance. Accordingly, JP-A-53-111336 proposes one having colloidal silica particles added to the above coating composition, which is used practically for eyeglass lenses.

Heretofore, plastic lenses for eyeglasses have been produced by casting diethylene glycol bisallyl carbonate in a monomer state, followed by polymerization. The lenses produced in such a manner have a refractive index of about 1.50, which is low as compared with the refractive index of about 1.52 of glass lenses, and in the case of lenses for short sighted, there is a problem that the peripheral thickness has to be increased. Accordingly, in recent years, there has been development of monomers having higher refractive indices than the diethylene glycol bisallyl carbonate. For example, resin materials having high refractive indices are proposed, for example, in JP-A-55-13747, JP-A-56-166214, JP-A-57-23611, JP-A-57-54901, JP-A-59-133211, JP-A-60-199016 and JP-A-64-54021.

For lenses made of such resins having high refractive indices, JP-A-62-151801 and JP-A-63-275682 propose a method of using a colloidal dispersion of fine particles of an oxide of a metal such as Sb or Ti, for a coating material.

If such a conventional metal oxide sol, particularly a cationic metal oxide sol, is used as a component for a hard coating agent, not only the stability of the obtained hard coating agent tends to be insufficient, but also e.g. transparency, adhesion and weather resistance of the cured coating of the hard coating agent tend to be insufficient. Further, in a case where a $Sb_2O_5$ sol is used as a component for a hard coating agent, the refractive index of the cured coating will no longer increase adequately with this $Sb_2O_5$ sol if the refractive index of the plastic substrate for a lens is at least 1.60, since the refractive index of $Sb_2O_5$ is a level of from 1.65 to 1.70.

The above sol of tungstic oxide as disclosed in JP-A-54-52686 is obtained by adding a silicate to an aqueous solution of tungstic oxide obtainable by subjecting an aqueous solution of a tungstate to cation exchange. However, the sol is stable only in a strong acidic condition, and its effect to increase the refractive index of the coating film is small when used as a component for a hard coating agent.

The above silicate-stannate composite sol as disclosed in JP-B-50-40119 is obtained by subjecting a mixed aqueous solution of an alkali silicate and an alkali stannate to cation exchange. However, its effect to increase the refractive index of the coating film is also small when used as a component for a hard coating agent.

The coating composition having a silica sol added thereto, has a problem that the coating film is likely to have interference fringes which impair the appearance of the lenses. Further, in lenses, an antireflection film (composed of a multilayer structure film comprising thin films of inorganic oxides, based on an optical interference theory) is formed in many cases, on the coating film. In such a case, the antireflection film tends to exhibit, for example, a reflection color of extremely pale green, and this reflection color changes depending upon the position on the lens surface to form flecking.

A coating composition prepared by using a titanium oxide sol has a problem that the titanium oxide sol has a low compatibility with a silane coupling agent or its hydrolyzate, the stability tends to be low, and the coating layer formed by this coating composition tends to be poor in water resistance and tends to be blued by irradiation with ultraviolet rays.

SUMMARY OF THE INVENTION

It is an object of the present invention to provide a stable sol containing colloidal particles of a modified metal oxide which is stable in a wide pH range, and which further increases the properties of a hard coating film employing the modified metal oxide sol as disclosed in JP-A-3-217230 or JP-A-6-24746, such as scratch resistance, transparency, adhesion, water resistance and weather resistance.

Another object of the present invention to provide a coating composition which is capable of forming a coating film free from interference fringes or flecking in reflection colors, on a plastic molded product having a moderate to high refractive index of nd=1.54–1.70, and an optical element employing the coating composition. Further, it is to provide a coating composition for plastic molded products excellent in e.g. scratch resistance, surface hardness, abrasion resistance, flexibility, transparency, antistatic property, dyability, heat resistance, water resistance and chemical resistance, and an optical element employing the coating composition.

According to a first aspect of the present invention, there is provided a stable modified metal oxide sol which contains from 2 to 50 wt %, as calculated as metal oxides, of particles (c) comprising colloidal particles (a) of a metal oxide having primary particle diameters of from 2 to 60 nm, as nuclei, and a coating material (b) consisting of colloidal particles of an acidic oxide coated on the surface of the particles (a), and which has primary particle diameters of from 2 to 100 nm.

According to a second aspect of the present invention, there is provided the modified metal oxide sol according to the first aspect of the present invention, wherein the metal oxide as the nuclei is an oxide of at least one metal selected from the group consisting of Ti, Fe, Cu, Zn, Y, Zr, Nb, Mo, In, Sn, Sb, Ta, W, Pb, Bi and Ce.

According to a third aspect of the present invention, there is provided the modified metal oxide sol according to the first or second aspect of the present invention, wherein the acidic oxide to be used for the coating material (b), is antimony oxide.

According to a fourth aspect of the present invention, there is provided the modified metal oxide sol according to any one of the first to third aspects of the present invention, wherein the coating material (b) is an antimony pentoxide colloid containing an alkali component.

According to a fifth aspect of the present invention, there is provided the modified metal oxide sol according to the fourth aspect of the present invention, wherein the coating material (b) contains an alkali component consisting of an alkylamine, and has a M/Sb$_2$O$_5$ molar ratio (wherein M is an amine molecule) of from 0.02 to 4.00.

According to a six aspect of the present invention, there is provided the modified metal oxide sol according to any one of the first to fifth aspects of the present invention, wherein the coating material (b) further contains an alkylamine-containing silica.

According to a seventh aspect of the present invention, there is provided a process for producing the modified metal oxide sol as defined in the first aspect of the present invention, which comprises mixing an aqueous sol containing the colloidal particles (a) of a metal oxide as nuclei, and an aqueous sol containing the coating material (b), in a weight ratio of (b)/(a) of from 0.01 to 1 as calculated as metal oxides, and heating the aqueous medium.

According to an eighth aspect of the present invention, there is provided a process for producing the modified metal oxide sol as defined in the first aspect of the present invention, which comprises mixing an aqueous sol containing the colloidal particles (a) of a metal oxide as nuclei, and an aqueous solution of a water-soluble alkali antimonate as the coating material (b), in a weight ratio of (b)/(a) of from 0.01 to 1 as calculated as metal oxides, and heating the aqueous medium, followed by cation exchange.

According to a ninth aspect of the present invention, there is provided a coating composition comprising the following components (A) and (B):

component (A): at least one silicon-containing substance selected from the group consisting of organic silicon compounds of the formula (I):

$$(R^1)_a(R^3)_b Si(OR^2)_{4-(a+b)} \quad (I)$$

wherein each of $R^1$ and $R^3$ is an alkyl group, an aryl group, a halogenated alkyl group, a halogenated aryl group, an alkenyl group, or an organic group having an epoxy group, an acryloyl group, a methacryloyl group, a mercapto group, an amino group or a cyano group, which is bonded to the silicon atom by a Si—C bond, $R^2$ is a $C_{1-8}$ alkyl group, an alkoxyalkyl group or an acyl group, and each of a and b is an integer of 0, 1 or 2, provided that a+b is an integer of 0, 1 or 2, and the formula (II):

$$[(R^4)_c Si(OX)_{3-c}]_2 Y \quad (II)$$

wherein $R^4$ is a $C_{1-5}$ alkyl group, X is a $C_{1-4}$ alkyl group or an acyl group, Y is a methylene group or a $C_{2-20}$ alkylene group, and c is an integer of 0 or 1, and their hydrolyzates; and component (B): colloidal particles of a modified metal oxide which have primary particle diameters of from 2 to 100 nm and which contain particles (c) comprising colloidal particles (a) of a metal oxide having primary particle diameters of from 2 to 60 nm, as nuclei, and a coating material (b) consisting of colloidal particles of an acidic oxide coated on the surface of the particles (a).

According to a tenth aspect of the present invention, there is provided the coating composition according to the ninth aspect of the present invention, wherein the component (A) is at least one silicon-containing substance selected from the group consisting of the organic silicon compounds of the formula (I) and their hydrolyzates.

According to an eleventh aspect of the present invention, there is provided the coating composition according to the ninth or tenth aspects of the present invention, wherein the metal oxide to be used for the nuclei of the component (B) is an oxide of at least one metal selected from the group consisting of Ti, Fe, Cu, Zn, Y, Zr, Nb, Mo, In, Sn, Sb, Ta, W, Pb, Bi and Ce.

According to a twelfth aspect of the present invention, there is provided the coating composition according to any one of the ninth to eleventh aspects of the present invention, wherein the acidic oxide to be used for the coating material (b) of the component (B), is antimony oxide.

According to a thirteenth aspect of the present invention, there is provided the coating composition according to any one of the ninth to twelfth aspects of the present invention, wherein the coating material (b) of the component (B) is a diantimony pentoxide colloid containing an alkali component.

According to a fourteenth aspect of the present invention, there is provided the coating composition according to the thirteenth aspect of the present invention, wherein the coating material (b) of the component (B) contains an alkali component consisting of an alkylamine, and has a $M/Sb_2O_5$ molar ratio (wherein M is an amine molecule) of from 0.02 to 4.00.

According to a fifteenth aspect of the present invention, there is provided the coating composition according to any one of the ninth to fourteenth aspects of the present invention, wherein the coating material (b) of the component (B) further contains an alkylamine-containing silica.

According to a sixteenth aspect of the present invention, there is provided the coating composition according to any one of the ninth to fifteenth aspects of the present invention, which contains at least one curing catalyst selected from the group consisting of metal salts, metal alkoxides and metal chelates.

According to a seventeenth aspect of the present invention, there is provided an optical element which comprises an optical substrate and a cured film made of the coating composition as defined in any one of the ninth to sixteenth aspects of the present invention, formed on the surface of the optical substrate.

According to an eighteenth aspect of the present invention, there is provided the optical element according to the seventeenth aspect of the present invention, which further has an antireflection film formed on its surface.

DETAILED DESCRIPTION OF PREFERRED EMBODIMENTS

Now, the present invention will be described in detail with reference to the preferred embodiments.

According to the first aspect, the present invention provides a stable modified metal oxide sol which contains from 2 to 50 wt %, as calculated as metal oxides, of particles (c) comprising colloidal particles (a) of a metal oxide having primary particle diameters of from 2 to 60 nm, as nuclei, and a coating material (b) consisting of colloidal particles of an acidic oxide coated on the surface of the particles (a), and which has primary particle diameters of from 2 to 100 nm.

Here, with respect to the primary particle diameters, a primary sol is a sol wherein particles are dispersed as individual particles, or in a state close thereto. The particles in such a primary sol are referred to as primary particles, and the primary particle diameters are diameters of such primary particles. A secondary sol is a sol wherein several primary particles in the primary sol agglomerate. In the present invention, diameters of particles (a) as nuclei, colloidal particles (b) for coating and particles (c) of a modified metal oxide are all represented by primary particle diameters. Each diameter is not a diameter of an agglomerated particle of (a), (b) or (c), but a diameter of an individual particle (a), (b) or (c) when an agglomerated particle has been dissociated into individual particles (a), (b) or (c), and such primary particle diameters can be measured by an electron microscope.

Colloidal particles (a) of a metal oxide having primary particle diameters of from 2 to 60 nm may be produced by a known method such as an ion exchange method, a peptization method, a hydrolysis method or a reaction method. Examples of the ion exchange method include a method of treating an acid salt of the above metal with a hydrogen form ion exchange resin, and a method of treating a basic salt of the above metal with a hydroxyl group form anion exchange resin. Examples of the peptization method include a method of washing a gel obtained by neutralizing an acid salt of the above metal with a base or by neutralizing a basic salt of the above metal with an acid, followed by peptization with an acid or a base. Examples of the above hydrolysis method include a method of hydrolyzing an alkoxide of the above metal, and a method of hydrolyzing a basic salt of the above metal under heating, followed by removal of an unnecessary acid. Examples of the reaction method include a method of reacting a powder of the above metal with an acid. A metal oxide as the nuclei is an oxide of at least one metal selected from the group consisting of Ti, Fe, Cu, Zn, Y, Zr, Nb, Mo, In, Sn, Sb, Ta, W, Pb, Bi and Ce. Colloidal particles (A) of this metal oxide is an oxide of a metal having a valence of from 2 to 6, and the form of the oxide of such a metal may, for example, be $TiO_2$, $Fe_2O_3$, $CuO$, $ZnO$, $Y_2O_3$, $ZrO_2$, $Nb_2O_5$, $MoO_3$, $In_2O_3$, $SnO_2$, $Sb_2O_5$, $Ta_2O_5$, $WO_3$, $PbO$ or $Bi_2O_3$. These metal oxides may be used alone or in combination. When they are used as combined, several types of the above metal oxides are mixed, the above metal oxides are made into a composite, or the above metal oxides are made into a solid solution at a level of atoms. For example, colloidal particles of a $SnO_2$—$WO_3$ composite wherein $SnO_2$ particles and $WO_3$ particles are chemically bonded at their interfaces to form a composite, colloidal particles of a $SnO_2$—$ZrO_2$ composite wherein $SnO_2$ particles and $ZrO_2$ particles are chemically bonded at their interfaces to form a composite, or colloidal particles of a $TiO_2$—$ZrO_2$—$SnO_2$ composite wherein $TiO_2$, $ZrO_2$ and $SnO_2$ are formed into a solid solution at a level of atoms, may be mentioned. The oxide of a metal to be used for nuclei, may be used as a compound by combination of metal components, and examples of which include $ZnSb_2O_6$, $InSbO_4$ and $ZnSnO_3$.

In the first aspect of the present invention, particles (c) comprising colloidal particles (a) of a metal oxide as nuclei, and a coating material (b) consisting of colloidal particles of an acidic oxide coated on the surface of the particles (a), is obtained. As the acidic oxide to be used for the coating material (b), antimony oxide may be used.

As the coating material (b), a diantimony pentoxide colloid containing an alkali component is preferably used.

The diantimony pentoxide colloid containing an alkali component may be obtained by the following methods (e.g. oxidation method and acid decomposition method). Examples of the acid decomposition method include a method of reacting an alkali antimonate with an inorganic acid, followed by peptization with an amine (JP-A-60-41536, JP-A-61-227918). Examples of the oxidation method include a method of oxidizing diantimony trioxide with hydrogen peroxide in the presence of an amine or an alkali metal (JP-B-57-11848, JP-A-59-232921), and a method of oxidizing diantimony trioxide with hydrogen peroxide, and then adding an amine or an alkali metal thereto.

The alkali component in the diantimony pentoxide colloid containing an alkali component, may, for example, be an alkali metal, ammonium, a quaternary ammonium or a water-soluble amine. Among these, preferred are Na, K and $NH_3$, alkylamines such as isopropylamine, diisopropylamine, n-propylamine and diisobutylamine, aralkylamines such as benzylamine, alicyclic amines such as piperidine, and alkanolamines such as monoethanolamine and triethanolamine. Particularly preferred as an alkali metal is potassium, and preferred as an organic base is diisopropylamine. The molar ratio of the alkali component to the diantimony pentoxide, i.e. $M/Sb_2O_5$, is preferably from 0.02 to 4.00 in the diantimony pentoxide colloid containing an alkali component. If it is smaller than this range, the stability of the colloid to be obtained tends to be poor, and if it is higher than this range, the dried coating film to be obtained by using such a sol tends to have a low water resistance, such being undesirable practically.

Colloidal particles of diantimony pentoxide containing an alkali component are fine colloidal particles of diantimony pentoxide, and have primary particle diameters of from about 1 to about 20 nm as observed by an electron microscope. As the alkali component, preferred is an amine salt of e.g. diisopropylamine, and the molar ratio of amine/$Sb_2O_5$ is from 0.02 to 4.00.

With respect to the above coating material (b), an alkylamine-containing silica particles may further be added to colloidal particles of diantimony pentoxide containing an alkali component.

As a process for producing the modified metal oxide sol of the present invention, a first process is a process of mixing an aqueous sol containing the colloidal particles (a) of a metal oxide as nuclei, and an aqueous sol containing the coating material (b), in a weight ratio of (b)/(a) of from 0.01 to 1 as calculated as metal oxides, and heating the aqueous medium. For example, an aqueous sol containing colloidal particles (a) of a metal oxide and a sol containing colloidal particles (b) of diantimony pentoxide containing an alkylamine as the alkali component, are mixed in the above ratio, followed by heating the aqueous medium, to obtain a modified metal oxide sol containing particles (c) comprising colloidal particles (a) as nuclei and colloidal particles (b) of diantimony pentoxide containing an alkali component coated on the surface of the colloidal particles (a).

Further, a second process for producing the modified metal oxide sol is a process of mixing an aqueous sol containing colloidal particles (a) of a metal oxide as nuclei, and an aqueous solution of a water-soluble alkali antimonate as the coating material (b), in a weight ratio of (b)/(a) of from 0.01 to 1 as calculated as metal oxides, and heating the aqueous medium, followed by cation exchange. The aqueous solution of a water-soluble alkali antimonate to be used in said second process is preferably an aqueous solution of potassium antimonate. For example, an aqueous sol containing colloidal particles (a) of a metal oxide, and an aqueous solution of potassium antimonate as the coating material (b), are mixed and heated, and then ion exchange is carried out, followed by stabilization with an alkali component such as an alkylamine, to obtain a modified metal oxide sol containing particles (c) comprising colloidal particles (a) and colloidal particles (b) of diantimony pentoxide containing an alkali component coated on the surface of the colloidal particles (a).

In the above first or second process, in a case where the colloidal particles (a) of a metal oxide as nuclei are in a form of an acid sol, the colloidal particles (a) may be mixed with colloidal particles of diantimony pentoxide containing an alkylamine as an alkali component or a water-soluble alkali antimonate as the coating material (b), in a weight ratio (b)/(a) of from 0.01 to 1 as calculated as metal oxides, and anion exchange of the aqueous medium may be carried out to obtain colloidal particles (a'), and an aqueous medium containing colloidal particles (a') may be heated in the above first process, or an aqueous medium containing colloidal particles (a') may be heated and subjected to cation exchange, followed by stabilization with an alkali component such as an alkylamine, in the above second process, to obtain a modified metal oxide sol.

The above mixing may be carried out at a temperature of from 0 to 100° C., preferably from room temperature to 60° C. It is possible to carry out the heating by using an autoclave at a temperature of at least 100° C., but it is carried out preferably at a temperature of from 70 to 95° C.

It is preferred to select concentrations of both components to be used for the mixing before the mixing so that the sol of modified colloidal particles (c) to be obtained by the mixing contains the metal oxide of the component (a) and the coating material component (b) as calculated as oxide in a total amount of from 2 to 40 wt %.

The modified metal oxide sol according to the first aspect of the present invention may contain an optional component so long as the purpose of the present invention is achieved. Particularly when an oxycarboxylic acid is contained in an amount of at most about 30 wt % based on the total amount of metal oxides, a colloid having further improved performances such as dispersibility, will be obtained. Examples of the oxycarboxylic acid to be used include lactic acid, tartaric acid, citric acid, gluconic acid, malic acid and glycollic acid. Further, an alkali component may be contained, such as an alkali metal hydroxide of e.g. Li, Na, K, Rb or Cs; $NH_4$, an alkylamine such as ethylamine, triethylamine, isopropylamine or n-propylamine; an aralkylamine such as benzylamine, an alicyclic amine such as piperidine; or an alkanolamine such as monoethanolamine or triethanolamine. They may be used in combination as a mixture of two or more of them. Further, they may be used together with the above acid component. They may be contained in an amount of at most about 30 wt % based on the total amount of the metal oxides.

In order to further increase the sol concentration, it is possible to carry out concentration up to a level of 50 wt % by a conventional method such as a distillation method or an ultrafiltration method. To adjust the pH of the sol, e.g. the above alkali metal, organic base (amine) or oxycarboxylic acid may be added to the sol after the concentration. Particularly, a sol having a total concentration of the metal oxides of from 10 to 40 wt % is practically preferred.

When the modified metal oxide colloid obtained by the above mixing is an aqueous sol, an organosol may be obtained by replacing the aqueous medium in the aqueous sol with a hydrophilic organic solvent. This replacement may be carried out by a conventional method such as a distillation method or an ultrafiltration method. Examples of the hydrophilic organic solvent include lower alcohols such as methyl alcohol, ethyl alcohol and isopropyl alcohol; linear amides such as dimethylformamide and N, N'-dimethylacetamide; cyclic amides such as N-methyl-2-pyrrolidone; and glycols such as ethyl cellosolve and ethylene glycol.

According to the ninth aspect, the present invention provides a coating composition comprising the following components (A) and (B):

component (A): at least one silicon-containing substance selected from the group consisting of organic silicon compounds of the formula (I):

$$(R^1)_a(R^3)_b Si(OR^2)_{4-(a+b)} \qquad (I)$$

wherein each of $R^1$ and $R^3$ is an alkyl group, an aryl group, a halogenated alkyl group, a halogenated aryl group, an alkenyl group, or an organic group having an epoxy group, an acryloyl group, a methacryloyl group, a mercapto group, an amino group or a cyano group, which is bonded to the silicon atom by a Si—C bond, $R^2$ is a $C_{1-8}$ alkyl group, an alkoxyalkyl group or an acyl group, and each of a and b is an integer of 0, 1 or 2, provided that a+b is an integer of 0, 1 or 2, and the formula (II):

$$[(R^4)_c Si(ox)_{3-c}]_2 Y \quad (II)$$

wherein $R^4$ is a $C_{1-5}$ alkyl group, X is a $C_{1-4}$ alkyl group or an acyl group, Y is a methylene group or a $C_{2-20}$ alkylene group, and c is an integer of 0 or 1, and their hydrolyzates; and component (B): colloidal particles of a modified metal oxide which have primary particle diameters of from 2 to 100 nm and which contain colloidal particles (c) comprising colloidal particles (a) of a metal oxide having primary particle diameters of from 2 to 60 nm, as nuclei, and a coating material (b) consisting of colloidal particles of an acidic oxide coated on the surface of the particles (a).

The formula (I) for component (A) to be used for the coating composition according to the ninth aspect of the present invention:

$$(R^1)_a(R^3)_b Si(OR)_{4-(a+b)} \quad (I)$$

includes an organic silicon compound wherein $R^1$ and $R^3$ are the same organic groups or different organic groups, and a and b are the same integers or different integers. The organic silicon compound of the formula (I) for component (A) may, for example, be tetramethoxysilane, tetraethoxysilane, tetra n-propoxysilane, tetraisopropoxysilane, tetra n-butoxysilane, tetraacetoxysilane, methyltrimethoxysilane, methyltripropoxysilane, methyltriacetoxysilane, methyltributoxysilane, methyltripropoxysilane, methyltriamyloxysilane, methyltriphenoxysilane, methyltribenzyloxysilane, methyltriphenetyloxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(3,4-epoxycyclohexyl)butyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, β-glycidoxypropylmethyldiethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, ethyltrimethoxysilane, ethyltriethoxysilane, vinyltrimethoxysilane, vinyltriethoxysilane, vinyltriacetoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-mercaptopropyltrimethoxysilane, γ-mercaptopropyltriethoxysilane, β-cyanoethyltriethoxysilane, chloromethyltrimethoxysilane, chloromethyltriethoxysilane, N-(β-aminoethyl) γ-aminopropyltrimethoxysilane, N-(β-aminoethyl) γ-aminopropylmethyldimethoxysilane, γ-aminopropylmethyldimethoxysilane, N-(β-aminoethyl) γ-aminopropyltriethoxysilane, N-(β-aminoethyl) γ-aminopropylmethyldiethoxysilane, dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptomethyldiethoxysilane, methylvinyldimethoxysilane, or methylvinyldiethoxysilane. These organic silicon compounds may be used alone or in combination as a mixture of two or more of them.

The hydrolyzates of organic silicon compounds of the formula (I) for component (A) to be used for the coating composition according to the ninth aspect of the present invention, are compounds obtained by hydrolysis of the organic silicon compounds of the formula (I) so that a part or all of $R^2$ is substituted by hydrogen atoms. Such hydrolyzates of the organic silicon compounds of the formula (I) may be used alone or in combination as a mixture of two or more of them. The hydrolysis is carried out by adding an aqueous acidic solution such as an aqueous hydrochloric acid solution, an aqueous sulfuric acid solution or an aqueous acetic acid solution to the organic silicon compound, followed by stirring.

The organic silicon compound of the formula (II):

$$[(R^4)_c Si(OX)_{3-c}]_2 Y \quad (II)$$

for component (A) to be used for the coating composition according to the ninth aspect of the present invention, may, for example, be methylenebismethyldimethoxysilane, ethylenebisethyldimethoxysilane, propylenebisethyldiethoxysilane or butylenebismethyldiethoxysilane. These organic silicon compounds may be used alone or in combination as a mixture of two or more of them.

The hydrolyzates of organic silicon compounds of the formula (II) for component (A) to be used for the coating composition according to the ninth aspect of the present invention, are compounds obtained by hydrolysis of the organic silicon compounds of the formula (II) so that a part or all of X is substituted by hydrogen atoms. Such hydrolyzates of the organic silicon compounds of the formula (II) may be used alone or in combination as a mixture of two or more of them. The hydrolysis is carried out by adding an aqueous acidic solution such as an aqueous hydrochloric acid solution, an aqueous sulfuric acid solution or an aqueous acetic acid solution to the organic silicon compound, followed by stirring.

Component (A) to be used for the coating composition according to the ninth aspect of the present invention, is at least one silicon-containing substance selected from the group consisting of organic silicon compounds of the formulae (I) and (II) and their hydrolyzates.

Component (A) to be used for the coating composition according to the ninth aspect of the present invention, is preferably at least one silicon-containing substance selected from the group consisting of organic silicon compounds of the formula (I) and their hydrolyzates. Particularly preferred are organic silicon compounds of the formula (I) wherein either one of $R^1$ and $R^3$ is an organic group having an epoxy group, $R^2$ is an alkyl group, and each of a and b is 0 or 1, provided that a+b is 1 or 2, and their hydrolyzates. Examples of such preferred organic silicon compounds include glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylethyldimethoxysilane, α-glycidoxypropylmethyldimethoxysilane, α-glycidoxypropylmethyldiethoxysilane, β-glycidoxypropylmethyldimethoxysilane, β-glycidoxypropylethyldimethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, and γ-glycidoxypropylvinyldiethoxysilane.

More preferred are γ-glycidoxypropyltrimethoxysilane, γ-glycidoxypropylmethyldiethoxysilane, γ-glycidoxypropylmethyldimethoxysilane and their hydrolyzates, and they may be used alone or in combination as a mixture. Further, γ-glycidoxypropyltrimethoxysilane, γ-glycidoxypropylmethyldiethoxysilane, γ-glycidoxypropylmethyldimethoxysilane or a hydrolyzate thereof may be used in combination with a tetrafunctional compound of the formula (I) wherein a+b=0. Examples of the tetrafunctional compound include tetramethoxysilane, tetraethoxysilane, tetraisopropoxysilane, tetra n-propoxysilane, tetra n-butoxysilane, tetra tert-butoxysilane and tetra sec-butoxysilane.

Component (B) to be used for the coating composition according to the ninth aspect of the present invention, is preferably a sol containing colloidal particles of a modified metal oxide, which contains from 2 to 50 wt %, as calculated as metal oxides, of particles (c) comprising colloidal particles (a) of a metal oxide having primary particle diameters of from 2 to 60 nm, as nuclei, and a coating material (b) consisting of colloidal particles of an acidic oxide coated on the surface of the particles (a), and which has primary particle diameters of from 2 to 100 nm. As such a modified metal oxide sol, the modified metal oxide sol according to the first aspect of the present invention, may be used.

The coating composition according to the ninth aspect of the present invention preferably contains from 1 to 500 parts by weight of colloidal particles of a modified metal oxide which contain particles (c) comprising colloidal particles (a) of a metal oxide having primary particle diameters of from 2 to 60 nm, as nuclei, and a coating material (b) consisting of colloidal particles of an acidic oxide coated on the surface of the colloidal particles (a), and which have primary particle diameters of from 2 to 100 nm, based on 100 parts by weight of an organic silicon compound. If the modified metal oxide sol is less than 1 part by weight, the cured film tends to have a low refractive index, and application to a substrate will be significantly limited. Further, if it exceeds 500 parts by weight, e.g. cracks are likely to form between the cured film and the substrate, and there is a high possibility of decrease in transparency.

To the coating composition according to the ninth aspect of the present invention, a curing agent may be incorporated so as to accelerate the reaction, fine particulate of a metal oxide may be incorporated so as to adjust the refractive index with lenses to be various substrates, or a surface active agent may be incorporated so as to improve wettability at the time of coating and to improve smoothness of the cured film. Further, e.g. an ultraviolet absorber or an antioxidant may be added within a range of not impairing physical properties of the cured film.

The curing agent may, for example, be an amine such as allylamine or ethylamine, a salt or a metal salt having an acid or a base containing a Lewis acid or a Lewis base, such as organic carboxylic acid, chromic acid, hypochlorous acid, boric acid, perchloric acid, bromic acid, selenious acid, thiosulfuric acid, orthosilicic acid, thiocyanic acid, nitrous acid, aluminic acid or carbonic acid, or an alkoxide or chelate of a metal such as aluminum, zirconium or titanium.

Further, the fine particulate metal oxide may, for example, be fine particles of e.g. aluminum oxide, titanium oxide, antimony oxide, zirconium oxide, silicon oxide or cerium oxide.

According to the seventeenth aspect of the present invention, there is provided an optical element which comprises an optical substrate and a cured film made of the coating composition according to the ninth aspect of the present invention formed on the surface of the optical substrate. Further, according to the eighteenth aspect of the present invention, there is provided the optical element which further has an antireflection film formed on its surface.

The coating composition according to the ninth aspect of the present invention may be coated on a substrate, followed by curing, to obtain a cured film. The present invention further provides an optical element which has a cured film made of the above coating composition, a shock absorbing film, and an antireflection film laminated on its surface. Curing of the coating composition may be carried out by hot air drying or irradiation with active energy rays. As the curing conditions, curing is preferably carried out in a hot air of from 70 to 200° C., particularly preferably from 90 to 150° C. As the active energy rays, far infrared rays may be used, whereby damage due to heat can be suppressed to a low level.

As a method of forming the cured film made of the coating composition according to the ninth aspect of the present invention on a substrate, the above method of coating the coating composition on a substrate, may be mentioned. As a coating means, a conventional method such as a dipping method, a spin coating method or a spray coating method may be employed. However, a dipping method or a spin coating method is particularly preferred from the viewpoint of the area degree.

Further, adhesion between the substrate and the cured film may be improved by applying chemical treatment by means of an acid, an alkali or various organic solvents, physical treatment by means of plasma or ultraviolet rays, washing treatment by means of various washing agents or primer treatment by means of various resins, prior to coating the above coating composition on the substrate.

Further, an antireflection film of vapor deposition film of an inorganic oxide may be formed on the cured film made of the above coating composition. The antireflection film is not particularly limited, and a conventionally known single-layer or multilayer antireflection film of a vapor deposition film of an inorganic oxide may be used. Examples of the antireflection film include antireflection films as disclosed in JP-A-2-262104 and JP-A-56-116003.

The shock absorbing film will improve a shock resistance of the optical element. The shock absorbing film is made of a polyvinyl alcohol resin, polyvinyl acetate resin, or polyacrylic acid resin, etc.

Further, the cured film made of the coating composition is useful as an antireflection film as a high refractive index film. Further, by incorporating a functional component for e.g. antifogging, photochromic or stain proofing, it may also be used as a multifunctional film.

The optical element having the cured film made of the coating composition is useful as not only lenses for eyeglasses, but also lenses for cameras, window glasses for automobiles and optical filters for liquid crystal display or plasma display devices.

Now, the present invention will be described in further detail with reference to Examples and Comparative Examples. However, it should be understood that the present invention is by no means restricted to such specific Examples.

A. Production of Colloidal Particles of a Metal Oxide

Preparation of a Titanium Oxide-Stannic Oxide-Zirconium Oxide Composite Sol

A-1

Step (a): 587.5 g (159.8 g as $TiO_2$) of titanium tetrachloride (manufactured by Sumitomo Sitix Corporation, containing 27.2 wt % as $TiO_2$ and 32.0 wt % as Cl), 35.65 g (24.6 g as $ZrO_2$) of zirconium oxychloride and 708.55 g of water were put in a jacketed separable flask of 3 l made of glass to prepare 1,331.7 g of an aqueous solution of titanium chloride and zirconium oxychloride mixture (containing 12.0 wt % as $TiO_2$ and 1.85 wt % as $ZrO_2$). This aqueous solution was heated to 60° C. with stirring with a glass stirring rod, and then 738.0 g of a 35% hydrogen peroxide solution (for industrial use) and 448.4 g of a metallic tin powder (AT-Sn, No. 200, manufactured by Yamaishi Metal K.K.) were added thereto under cooling.

Addition of the hydrogen peroxide solution and the metallic tin powder was carried out as follows. Firstly, 24.9 g of the metallic tin powder was gradually added and then 41.0 g of the hydrogen peroxide solution was gradually added, and after the completion of the reaction (after 5 to 10 minutes), the above addition of the metallic tin powder and the hydrogen peroxide solution was repeated. Such an operation was repeated for 17 times, and lastly, 41.0 g of the hydrogen peroxide solution was added and then 25.1 g of the metallic tin powder was added, so as to carry out divided addition in total of 18 times. Since the reaction was an exothermic reaction, the temperature increased to from 80 to 85° C. by addition of the metallic tin powder, and decreased to from 60 to 70° C. due to cooling after the completion of the reaction. Accordingly, the reaction temperature was from 60 to 85° C. The proportion of the hydrogen peroxide solution to the metallic tin was 2.0 as a $H_2O_2/Sn$ molar ratio at the time of addition. The time required for addition of the metallic tin powder and the hydrogen peroxide solution was 1.0 hour. Here, a proper amount of water was added to make up for water evaporated due to the reaction. After the completion of the reaction, 2,266 g of a pale yellow transparent aqueous basic solution of a titanium-zirconium-tin chloride composite salt was obtained. Of the obtained aqueous basic solution of a titanium-zirconium-tin chloride composite salt, the titanium oxide concentration was 7.10 wt %, the zirconium oxide concentration was 1.10 wt %, the tin oxide concentration was 25.2 wt %, the Zr/Ti molar ratio was 0.1, and the Ti/(Zr+Sn) molar ratio was 0.5. Further, the (Ti+Zr+Sn)/Cl molar ratio was 1.06.

Step (b): 12,810 g of water was added to 2,266 g of the aqueous basic solution of a titanium-zirconium-tin chloride composite salt obtained in step (a) to prepare an aqueous solution of 5 wt % as calculated as $TiO_2+ZrO_2+SnO_2$. This aqueous solution was subjected to hydrolysis at from 95 to 98° C. for 12 hours to obtain agglomerates of colloidal particles of a titanium oxide-zirconium oxide-tin oxide composite having primary particle diameters of from 4 to 8 nm.

Step (c): From the slurry of agglomerates of colloidal particles of a titanium oxide-zirconium oxide-tin oxide composite obtained in step (b), an excess electrolyte was removed by washing by carrying out concentration and water injection repeatedly by means of an ultrafiltration apparatus using about 20 l of water, followed by peptization to obtain 14,780.4 g of an aqueous acidic sol of a titanium oxide-zirconium oxide-tin oxide composite.

Step (d): 5.1 g of isopropylamine and 2.7 g of diisopropylamine were added to 5,647 g of the aqueous sol obtained in step (c), and the sol was passed through a column having a hydroxyl group form anion exchange resin (AMBERLITE 410) packed therein at room temperature to obtain 6,963 g of an aqueous sol (diluted liquid) of a titanium oxide-stannic oxide-zirconium oxide composite. This sol had a concentration of 4.05 wt % as calculated as total metal oxides and a pH of 9.47, and tended to become clouded. However, by heating the sol for aging at 80° C. for 1 hour, 6,950 g of a sol having good transparency was obtained.

Preparation of a Titanium Oxide-Stannic Oxide-Zirconium Oxide Composite Sol

A-2

Step (a'): Into a glass lining reaction vessel equipped with a faudler type agitating element, 146 kg of water and 248.8 kg (69.39 kg as $TiO_2$) of titanium tetrachloride (manufactured by Sumitomo Sitix Corporation, containing 27.89 wt % as $TiO_2$ and 31.7 wt % as Cl) were introduced, and 25.5 kg of zirconyl carbonate (containing 10.73 kg as $ZrO_2$) was gradually added thereto with stirring for dissolution, to prepare 420.3 kg of an aqueous basic solution of titanium-zirconium chloride mixture (containing 16.51 wt % as $TiO_2$ and 4.11 wt % as $ZrO_2$). To this aqueous solution, 41.5 kg of a metallic tin powder (AT-Sn, No. 200, manufactured by Yamaishi Metal K.K.) and 71.4 kg of a 35% hydrogen peroxide solution (for industrial use) were added under cooling.

5.1 kg of the metallic tin powder was added and then 8.8 kg of the hydrogen peroxide solution was added, and this addition was repeated. Such an operation was repeated for 7 times, and lastly 5.8 kg of the metallic tin powder was added and then 9.8 kg of the hydrogen peroxide solution was added, so as to carry out divided addition in total of 8 times. Since the reaction was an exothermic reaction, the temperature increased to from 70 to 75° C. by addition of hydrogen peroxide, and decreased to from 55 to 60° C. due to cooling after the completion of the reaction. Accordingly, the reaction temperature was from 55 to 75° C. The proportion of hydrogen peroxide to metallic tin was 2.1 as a $H_2O_2/Sn$ molar ratio at the time of addition. The time required for addition of the hydrogen peroxide solution and the metallic tin powder was 2 hours and 45 minutes. Here, a proper amount of water was added to make up for water evaporated due to reaction. After the completion of the reaction, 500 kg of a pale yellow transparent aqueous basic solution of a titanium-zirconium-tin chloride composite salt was obtained. Of the obtained aqueous basic solution of a titanium-zirconium-tin chloride composite salt, the titanium oxide concentration was 13.88 wt %, the zirconium oxide concentration was 2.15 wt %, the tin oxide concentration was 10.54 wt %, the Zr/Ti molar ratio was 0.1, and the Ti/(Zr+Sn) molar ratio was 2.0. Further, the (Ti+Zr+Sn)/Cl molar ratio was 0.59.

Step (b'): 500 kg of the aqueous basic solution of a titanium-zirconium-tin chloride composite salt obtained in step (a') was added to 2,200 kg of water, to obtain an aqueous solution of 5 wt % as calculated as $TiO_2+ZrO_2+SnO_2$. This aqueous solution was subjected to hydrolysis at from 95 to 98° C. for 10 hours to obtain agglomerates of colloidal particles of a titanium oxide-zirconium oxide-tin oxide composite having primary particle diameters of from 4 to 8 nm.

Step (c'): From the slurry of agglomerates of colloidal particles of a titanium oxide-zirconium oxide-tin oxide composite obtained in step (b'), an excess electrolyte was removed by washing by carrying out concentration and water injection repeatedly by means of an ultrafiltration apparatus using about 21 m³ of water, followed by peptization, to obtain 2,700 kg of an aqueous acidic sol of a titanium oxide-zirconium oxide-tin oxide composite. This sol had a concentration of 5.5 wt % as calculated as total metal oxides, a pH of 2.70, and an electrical conductance of 1,361 μS/cm.

Step (d'): 2,192 kg of the aqueous sol obtained in step (c') was diluted with 1,827 kg of water, 3.62 kg of diisopropylamine was added thereto, and the obtained diluted sol was passed through a column having a hydroxyl group form anion exchange resin (AMBERLITE IRA-410) packed therein at room temperature to obtain 4.200 kg of an aqueous sol (diluted liquid) of a titanium oxide-zirconium oxide-tin oxide composite. This sol had a concentration of 2.87 wt % as calculated as total metal oxides and a pH of 10.04, and tended to become clouded. However, by heating the sol for aging at 80° C. for 1 hour, a sol having good transparency was obtained.

B. Preparation of Coating Materials

Preparation of a Diantimony Pentoxide Colloid Containing an Alkali Component

B-1

Into a four-necked flask of 500 ml, 52.6 g of diantimony trioxide (manufactured by Kanton Mikuni, containing 99.5% as $Sb_2O_3$), 444 g of pure water and 40.2 g of diisopropylamine were introduced and heated to 70° C. with stirring with a stirrer, and 53 g of 35% hydrogen peroxide was gradually added thereto. After the completion of the reaction, the reaction mixture was subjected to filtration with a glass filter paper (GA-100, manufactured by ADVANTEC). The $Sb_2O_5$ concentration was 9.8 wt %, the diisopropylamine concentration was 6.8 wt %, the molar ratio of diisopropylamine/$Sb_2O_5$ was 2.2, and the primary particle diameters were from 1 to 10 nm as observed by a transmission electron microscope.

Preparation of a Diantimony Pentoxide Colloid Containing an Alkali Component

B-2

Into a four-necked flask of 500 ml, 87.6 g of diantimony trioxide (manufactured by Kanton Mikuni, containing 99.5% as $Sb_2O_3$), 460 g of pure water and 39.2 g of potassium hydroxide (manufactured by Koso Kagaku, first class grade chemical) were introduced and heated to 70° C. with stirring with a stirrer, and 63.2 g of 35% hydrogen peroxide was gradually added thereto. After the completion of the reaction, the reaction mixture was subjected to filtration with a glass filter paper (GA~100, manufactured by ADVANTEC). The $Sb_2O_5$ concentration was 15 wt %, the potassium hydroxide concentration was 5.6 wt %, and the molar ratio of $K_2O/Sb_2O_5$ was 1.0.

The obtained aqueous potassium antimonate solution was diluted to 2.5 wt %, and passed through a column having a cation form ion exchange resin packed therein. To the solution of antimonic acid after the ion exchange, 39.5 g of diisopropylamine was added with stirring, to obtain a colloidal solution of diantimony pentoxide containing an alkali component. The $Sb_2O_5$ concentration was 2.2 wt %, the diisopropylamine concentration was 0.9 wt %, the molar ratio of diisopropylamine/$Sb_2O_5$ was 1.3, and the primary particle diameters were from 1 to 10 nm as observed by a transmission electron microscope.

Preparation of a Diantimony Pentoxide Colloid Containing an Alkali Component

B-3

Into a four-necked flask of 500 ml, 56.9 g of diantimony trioxide (manufactured by Kanton Mikuni, containing 99.5% as $Sb_2O_3$), 313 g of pure water and 15.3 g of 85% phosphoric acid were introduced (weight ratio of $P_2O_5/Sb_2O_5$ of 0.15), and heated to 70° C. with stirring with a stirrer, and 77.8 g of 35% hydrogen peroxide was gradually added thereto. After the completion of the reaction, the reaction mixture was subjected to filtration with a glass filter paper (GA-100, manufactured by ADVANTEC). The $Sb_2O_5$ concentration was 13.2 wt %, and the phosphoric acid concentration was 0.14 wt %. To the obtained diantimony pentoxide sol, 15.8 g of diisopropylamine was further added, to obtain a diantimony pentoxide sol containing phosphoric acid and an amine. The $Sb_2O_5$ concentration was 13.2 wt %, the phosphoric acid concentration was 2.0 wt %, and the diisopropylamine concentration was 3.3 wt %. The molar ratio of diisopropylamine/$Sb_2O_5$ was 0.80, and the primary particle diameters were from 3 to 12 nm as observed by a transmission electron microscope.

Preparation of a Diantimony Pentoxide Colloid Containing an Alkali Component

B-4

Into a four-necked flask of 500 ml, 63.4 g of diantimony trioxide (manufactured by Kanton Mikuni, containing 99.5% as $Sb_2O_3$), 412.2 g of pure water, 17.1 g of 85% phosphoric acid and 45.2 g of diisopropylamine were introduced and heated to 70° C. with stirring with a stirrer, and 42.1 g of 35% hydrogen peroxide was gradually added thereto. After the completion of the reaction, the reaction mixture was subjected to filtration with a glass filter paper. The $Sb_2O_5$ concentration was 12.1 wt %, and the molar ratio of diisopropylamine/$Sb_2O_5$ was 2.1. To the obtained diantimony pentoxide sol, 17.5 g of diisopropylamine was added, to obtain 597.5 g of a diantimony pentoxide sol containing an alkali component. The primary particle diameters were from 2 to 12 nm as observed by a transmission electron microscope.

EXAMPLE 1

To the aqueous sol obtained in step (d) of A-1, 282 g of the diantimony pentoxide colloid containing an amine component, prepared in B-1, was added with stirring, so that they were mixed in a weight ratio of (B)/(A) of 0.1 as calculated as metal oxides, followed heating for aging at 90° C. for 3 hours.

The obtained aqueous sol (diluted liquid) of a modified titanium oxide-stannic oxide-zirconium oxide composite, was concentrated by a filtration apparatus with an ultrafilter membrane of a fractional molecular weight of 50,000 at room temperature, to obtain 2,655 g of an aqueous sol of a modified titanium oxide-stannic oxide-zirconium oxide composite of a high concentration. This sol had a specific gravity of 1.106, a pH of 8.93, a viscosity of 6.5 c.p. and a concentration of 11.3 wt % as calculated as metal oxides, and was stable.

Then, 885 g of the aqueous sol of a modified titanium oxide-stannic oxide-zirconium oxide composite of a high concentration, was subjected to distillation of water under reduced pressure by a rotary evaporator at a liquid temperature of at most 30° C., while gradually adding 7 l of methanol, to obtain 333.3 g of a methanol sol of a modified titanium oxide-stannic oxide-zirconium oxide composite, having water in the aqueous sol replaced with methanol. This sol had a specific gravity of 1.092, a pH of 7.60 (mixture with water in an equal weight), a viscosity of 3.4 c.p., a concentration of 30 wt % as calculated as metal oxides, a water content of 0.65 wt %, and particle diameters of from 5 to 15 nm as observed by an electron microscope. This sol showed a colloidal color and had a high transparency, and it was free from e.g. precipitates, white turbidity and thickening and was stable, even after left to stand at room temperature for 3 months. Further, the dried product of this sol had a refractive index of 1.92.

EXAMPLE 2

The same operation as in Example 1 was carried out except that 1,272 g of the diantimony pentoxide colloid containing an alkali component, prepared in B-2, was used instead of the diantimony pentoxide colloid containing an alkali component prepared in B-1, so that they were mixed in a weight ratio of (B)/(A) of 0.1 as calculated as metal oxides.

The obtained aqueous sol of a modified titanium oxide-stannic oxide-zirconium oxide composite of a high concentration, had a specific gravity of 1.108, a pH of 8.24, a viscosity of 6.0 c.p. and a concentration of 12.5 wt % as calculated as metal oxides, and was stable.

800 g of the above aqueous sol of a modified titanium oxide-stannic oxide-zirconium oxide composite of a high concentration, was subjected to distillation of water under reduced pressure by a rotary evaporator at a liquid temperature of at most 30° C., while gradually adding 7 l of methanol, to obtain 333.3 g of a methanol sol of a modified titanium oxide-stannic oxide-zirconium oxide composite, having water in the aqueous sol replaced with methanol. This sol had a specific gravity of 1.084, a pH of 7.72 (mixture with water in an equal weight), a viscosity of 4.7 c.p., a concentration of 30 wt % as calculated as metal oxides, a water content of 0.70 wt %, and particle diameters of from 5 to 15 nm as observed by an electron microscope. This sol showed a colloidal color and had a high transparency, and it was free from e.g. precipitates, white turbidity and thickening and was stable, even after left to stand at room temperature for 3 months. Further, the dried product of this sol had a refractive index of 1.87.

EXAMPLE 3

The same operation as in Example 1 was carried out except that 213 g of the diantimony pentoxide colloid containing an alkali component, prepared in B-3, was used instead of the diantimony pentoxide colloid containing an alkali component prepared in B-1, so that they were mixed in a weight ratio of (B)/(A) of 0.1 as calculated as metal oxides.

The obtained aqueous sol of a modified titanium oxide-stannic oxide-zirconium oxide composite of a high concentration, had a specific gravity of 1.092, a pH of 7.80, a viscosity of 3.1 c.p. and a concentration of 9.9 wt % as calculated as metal oxides, and was stable.

1,010 g of the above aqueous sol of a modified titanium oxide-stannic oxide-zirconium oxide composite of a high concentration, was subjected to distillation of water under reduced pressure by a rotary evaporator at a liquid temperature of at most 30° C., while gradually adding 7 l of methanol, to obtain 333.3 g of a methanol sol of a modified titanium oxide-stannic oxide-zirconium oxide composite, having water in the aqueous sol replaced with methanol. This sol had a specific gravity of 1.096, a pH of 7.69 (mixture with water in an equal weight), a viscosity of 4.3 c.p., a concentration of 30 wt % as calculated as metal oxides, a water content of 0.66 wt %, and particle diameters of from 5 to 15 nm as observed by an electron microscope. This sol showed a colloidal color and had a high transparency, and it was free from e.g. precipitates, white turbidity and thickening and was stable, even after left to stand at room temperature for 3 months. Further, the dried product of this sol had a refractive index of 1.87.

EXAMPLE 4

The same operation as in Example 1 was carried out except that 232 g of the diantimony pentoxide colloid containing an alkali component, prepared in B-4, was used instead of the diantimony pentoxide colloid containing an alkali component prepared in B-1, so that they were mixed in a weight ratio of (B)/(A) of 0.1 as calculated as metal oxides.

The obtained aqueous sol of a modified titanium oxide-stannic oxide-zirconium oxide composite of a high concentration, had a specific gravity of 1.146, a pH of 7.85, a viscosity of 7.0 c.p. (Brookfield rotational viscometer No. 1) and a concentration of 15.6 wt % as calculated as metal oxides, and was stable.

641 g of the above aqueous sol of a modified titanium oxide-stannic oxide-zirconium oxide composite of a high concentration, was subjected to distillation of water under reduced pressure by a rotary evaporator at a liquid temperature of at most 30° C., while gradually adding 7 l of methanol, to obtain 333.3 g of a methanol sol of a modified titanium oxide-stannic oxide-zirconium oxide composite, having water in the aqueous sol replaced with methanol. This sol had a specific gravity of 1.100, a pH of 7.60 (mixture with water in an equal weight), a viscosity of 5.6 c.p., a concentration of 30 wt % as calculated as metal oxides, a water content of 0.73 wt %, and particle diameters of from 5 to 15 nm as observed by an electron microscope. This sol showed a colloidal color and had a high transparency, and it was free from e.g. precipitates, white turbidity and thickening and was stable, even after left to stand at room temperature for 3 months. Further, the dried product of this sol had a refractive index of 1.87.

EXAMPLE 5

To 9,808 g of the aqueous sol obtained in step (d') of A-2, 282 g of the diantimony pentoxide colloid containing an amine component, prepared in B-1, was added with stirring, so that they were mixed in a weight ratio of (B)/(A) of 0.1 as calculated as metal oxides, followed heating for aging at 90° C. for 3 hours.

The obtained aqueous sol (diluted liquid) of a modified titanium oxide-stannic oxide-zirconium oxide composite, was concentrated by a filtration apparatus with an ultrafilter membrane of a fractional molecular weight of 50,000 at room temperature, to obtain 2,727 g of an aqueous sol of a modified titanium oxide-stannic oxide-zirconium oxide composite of a high concentration. This sol had a specific gravity of 1.104, a pH of 9.10, a viscosity of 7.0 c.p. and a concentration of 11.0 wt % as calculated as metal oxides, and was stable.

Then, the aqueous sol of a modified titanium oxide-stannic oxide-zirconium oxide composite of a high concentration, was subjected to distillation of water under reduced pressure by a rotary evaporator at a liquid temperature of at most 30° C., while gradually adding 7 l of methanol, to obtain 988 g of a methanol sol of a modified titanium oxide-stannic oxide-zirconium oxide composite, having water in the aqueous sol replaced with methanol. This sol had a specific gravity of 1.080, a pH of 8.01 (mixture with water in an equal weight), a viscosity of 5.0 c.p., a concentration of 30 wt % as calculated as metal oxides, a water content of 0.51 wt %, and particle diameters of from 5 to 15 nm as observed by an electron microscope. This sol showed a colloidal color and had a high transparency, and it was free from e.g. precipitates, white turbidity and thickening and was stable, even after left to stand at room temperature for 3 months. Further, the dried product of this sol had a refractive index of 1.92.

EXAMPLE 6

The same operation as in Example 5 was carried out except that 1,272 g of the diantimony pentoxide colloid containing an alkali component, prepared in B-2, was used instead of the diantimony pentoxide colloid containing an alkali component prepared in B-1, so that they were mixed in a weight ratio of (B)/(A) of 0.1 as calculated as metal oxides.

The obtained aqueous sol of a modified titanium oxide-stannic oxide-zirconium oxide composite of a high concentration, had a specific gravity of 1.100, a pH of 8.76, a viscosity of 7.4 c.p. and a concentration of 10.5 wt % as calculated as metal oxides, and was stable.

2,857 g of the above aqueous sol of a modified titanium oxide-stannic oxide-zirconium oxide composite of a high concentration, was subjected to distillation of water under reduced pressure by a rotary evaporator at a liquid temperature of at most 30° C., while gradually adding 7 l of methanol, to obtain 979 g of a methanol sol of a modified titanium oxide-stannic oxide-zirconium oxide composite, having water in the aqueous sol replaced with methanol. This sol had a specific gravity of 1.074, a pH of 8.28 (mixture with water in an equal weight), a viscosity of 6.3 c.p., a concentration of 30 wt % as calculated as metal oxides, a water content of 1.10 wt %, and particle diameters of from 5 to 15 nm as observed by an electron microscope. This sol showed a colloidal color and had a high transparency, and it was free from e.g. precipitates, white turbidity and thickening and was stable, even after left to stand at room temperature for 3 months. Further, the dried product of this sol had a refractive index of 1.92.

EXAMPLE 7

The same operation as in Example 5 was carried out except that 213 g of the diantimony pentoxide colloid containing an alkali component, prepared in B-3, was used instead of the diantimony pentoxide colloid containing an alkali component prepared in B-1, so that they were mixed in a weight ratio of (B)/(A) of 0.1 as calculated as metal oxides.

The obtained aqueous sol of a modified titanium oxide-stannic oxide-zirconium oxide composite of a high concentration, had a specific gravity of 1.106, a pH of 8.20, a viscosity of 5.6 c.p. and a concentration of 10.9 wt % as calculated as metal oxides, and was stable.

2,752 g of the above aqueous sol of a modified titanium oxide-stannic oxide-zirconium oxide composite of a high concentration, was subjected to distillation of water under reduced pressure by a rotary evaporator at a liquid temperature of at most 30° C., while gradually adding 7 l of methanol, to obtain 995 g of a methanol sol of a modified titanium oxide-stannic oxide-zirconium oxide composite, having water in the aqueous sol replaced with methanol. This sol had a specific gravity of 1.082, a pH of 7.71 (mixture with water in an equal weight), a viscosity of 8.4 c.p., a concentration of 30 wt % as calculated as metal oxides, a water content of 0.61 wt %, and particle diameters of from 5 to 15 nm as observed by an electron microscope. This sol showed a colloidal color and had a high transparency, and it was free from e.g. precipitates, white turbidity and thickening and was stable, even after left to stand at room temperature for 3 months. Further, the dried product of this sol had a refractive index of 1.92.

EXAMPLE 8

To the aqueous sol obtained in step (d) of A-1, 188 g of an aqueous potassium antimonate solution was added with stirring, so that they were mixed in a weight ratio of (B)/(A) of 0.1 as calculated as metal oxides, followed by heating for aging at 90° C. for 3 hours. Then, the mixture was diluted to 1.5 wt % as calculated as metal oxides, and the diluted mixture was passed through a column having a hydrogen form cation exchange resin packed therein, to remove potassium. To the obtained acidic sol, 7.05 g of diisopropylamine was added with intense stirring, followed by concentration by ultrafiltration.

Then, 3,100 g of the obtained sol was subjected to distillation of water under reduced pressure by a rotary evaporator at a liquid temperature of at most 30° C., while gradually adding 30 l of methanol, to obtain 1,128 g of a methanol sol of a modified titanium oxide-stannic oxide-zirconium oxide composite, having water in the aqueous sol replaced with methanol. This sol had a specific gravity of 0.984, a pH of 7.51 (mixture with water in an equal weight), a viscosity of 5.2 c.p., a concentration of 20 wt % as calculated as metal oxides, a water content of 0.60 wt %, and particle diameters of from 5 to 15 nm as observed by an electron microscope. This sol showed a colloidal color and had a high transparency, and it was free from e.g. precipitates, white turbidity and thickening and was stable, even after left to stand at room temperature for 3 months. Further, the dried product of this sol had a refractive index of 1.87.

EXAMPLE 9

1,013 g of the acidic sol obtained in step (c') of A-2 was added to a liquid obtained by diluting 56 g of the diantimony pentoxide colloid containing an alkali component, prepared in B-1, with 650 g of water, with stirring, so that they were mixed in a weight ratio of (B)/(A) of 0.1 as calculated as metal oxides. Then, the mixture was passed through a column having a hydroxyl group form anion exchange resin (AMBERLITE IRA-410) packed therein at room temperature to obtain an alkaline aqueous sol (diluted liquid) of a modified titanium oxide-stannic oxide-zirconium oxide composite. This sol had a concentration of 3.57 wt % as calculated as metal oxides, and a pH of 10.52. Then, said sol was heated for aging at 90° C. for 1 hour, to obtain a sol having good transparency.

The obtained aqueous sol (diluted liquid) of a modified titanium oxide-stannic oxide-zirconium oxide composite, was concentrated by a filtration apparatus with an ultrafilter membrane of a fractional molecular weight of 50,000 at room temperature, to obtain 343.2 g of an aqueous sol of a modified titanium oxide-stannic oxide-zirconium oxide composite. This sol had a concentration of 17.9 wt % as calculated as metal oxides.

Then, 343.2 g of the aqueous sol of a modified titanium oxide-stannic oxide-zirconium oxide composite of a high concentration, was subjected to distillation of water under reduced pressure by a rotary evaporator at a liquid temperature of at most 30° C., while gradually adding 7 l of methanol, to obtain 198 g of a methanol sol of a modified titanium oxide-stannic oxide-zirconium oxide composite, having water in the aqueous sol replaced with methanol. This sol had a specific gravity of 1.078, a pH of 7.67 (mixture with water in an equal weight), a viscosity of 3.1 c.p., a concentration of 30 wt % as calculated as metal oxides, a water content of 0.5 wt %, and particle diameters of from 5 to 15 nm as observed by an electron microscope. This sol showed a colloidal color and had a high transparency, and it was free from e.g. precipitates, white turbidity and thickening and was stable, even after left to stand at room temperature for 3 months. Further, the dried product of this sol had a refractive index of 1.92.

EXAMPLE 10

1,013 g of the acidic sol obtained in step (c') of A-2 was added to a liquid obtained by diluting 46.0 g of the diantimony pentoxide colloid containing an alkali component, prepared in B-4, with 940 g of water, with stirring, so that they were mixed in a weight ratio of (B)/(A) of 0.1 as calculated as metal oxides. Then, the mixture was passed through a column having a hydroxyl group form anion exchange resin (AMBERLITE IRA-410) packed therein at room temperature to obtain an alkaline aqueous sol (diluted liquid) of a modified titanium oxide-stannic oxide-zirconium oxide composite. This sol had a concentration of 2.8 wt % as calculated as metal oxides, and a pH of 10.62. Then, 23.0 g of the diantimony pentoxide colloid containing an alkali component, prepared in B-4, was further added and mixed so that the weight ratio of (B)/(A) was 0.15 in total, followed by heating for aging at 90° C. for 1 hour, to obtain a sol having good transparency.

The obtained aqueous sol (diluted liquid) of a modified titanium oxide-stannic oxide-zirconium oxide composite, was concentrated by a filtration apparatus with an ultrafilter membrane of a fractional molecular weight of 50,000 at room temperature, to obtain 643.0 g of an aqueous sol of a modified titanium oxide-stannic oxide-zirconium oxide composite. This sol had a concentration of 10.0 wt % as calculated as metal oxides.

Then, 643.5 g of the aqueous sol of a modified titanium oxide-stannic oxide-zirconium oxide composite of a high concentration, was subjected to distillation of water under reduced pressure by a rotary evaporator at a liquid temperature of at most 30° C., while gradually adding 9 l of methanol, to obtain 198.0 g of a methanol sol of a modified titanium oxide-stannic oxide-zirconium oxide composite, having water in the aqueous sol replaced with methanol. This sol had a specific gravity of 1.020, a pH of 7.88 (mixture with water in an equal weight), a viscosity of 6.0 c.p., a concentration of 25.0 wt % as calculated as metal oxides, a water content of 0.55 wt %, and particle diameters of from 5 to 15 nm as observed by an electron microscope. This sol showed a colloidal color and had a high transparency, and it was free from e.g. precipitates, white turbidity and thickening and was stable, even after left to stand at room temperature for 3 months. Further, the dried product of this sol had a refractive index of 1.93.

EXAMPLE 11

322 g of a zirconia sol (NZS-30AD, manufactured by Nissan Chemical Industries, Ltd., containing 30 wt % as $ZrO_2$) was diluted with 1,678 g of water. To this diluted solution, 150 g of the diantimony pentoxide colloid containing an alkali component (containing 10 wt % as calculated as $Sb_2O_5$) prepared in B-1, was added with intense stirring, so that they were mixed in a weight ratio of (B)/(A) of 0.15 as calculated as metal oxides, followed by heating for aging at 90° C. for 3 hours. The obtained modified zirconia sol was passed through a column having a hydroxyl group form anion exchange resin (AMBERLITE IRA-410) packed therein at room temperature, to obtain an alkaline modified zirconia sol. The obtained sol was concentrated by a filtration apparatus with an ultrafilter membrane of a fractional molecular weight of 50,000 at room temperature, to obtain 400 g of an alkaline modified zirconium oxide sol. This sol had a specific gravity of 1.310, a pH of 8.34, a viscosity of 3.0 c.p. and a concentration of 30.5 wt % as calculated as total metal oxides.

400 g of the modified zirconium oxide sol was subjected to distillation of water under reduced pressure by a rotary evaporator at a liquid temperature of at most 30° C., while gradually adding 5 l of methanol, to obtain 380 g of a modified zirconium oxide sol, having water replaced with methanol. This sol had a specific gravity of 1.092, a pH of 8.63 (mixture with water in an equal weight), a viscosity of 2.1 c.p., a concentration of 30.5 wt % as calculated as metal oxides, a water content of 1.1 wt %, and particle diameters of from 3 to 10 nm as observed by an electron microscope. This sol showed a colloidal color and had a high transparency, and it was free from e.g. precipitates, white turbidity and thickening and was stable, even after left to stand at room temperature for 3 months.

EXAMPLE 12

To the sol of a titanium oxide-stannic oxide-zirconium oxide composite obtained in step (d) of A-1, 282 g of the diantimony pentoxide colloid containing an alkali component prepared in B-1 (containing 9.8 wt % as $Sb_2O_5$) and 16.7 g of a colloid of an amine-containing active silicic acid (containing 3.0 wt % as calculated as $SiO_2$) were added with intense stirring, so that they were mixed in a weight ratio of (B)/(A) of 0.1 as calculated as metal oxides, followed by heating for aging at 90° C. for 3 hours. The obtained sol of a modified titanium oxide-stannic oxide-zirconium oxide composite was subjected to distillation of water under reduced pressure by a rotary evaporator at a liquid temperature of at most 30° C., while gradually adding 8 l of methanol, to obtain 1,200 g of a sol of a modified titanium oxide-stannic oxide-zirconium oxide composite, having water replaced with methanol. This sol had a specific gravity of 1.050, a pH of 7.37 (mixture with water in an equal weight), a viscosity of 4.5 c.p., a concentration of 25.0 wt % as calculated as metal oxides, a water content of 0.41 wt %, and particle diameters of from 5 to 15 nm as observed by an electron microscope. This sol showed a colloidal color and had a high transparency, and it was free from e.g. precipitates, white turbidity and thickening and was stable, even after left to stand at room temperature for 3 months.

COMPARATIVE EXAMPLE 1

The same operation as in Example 1 was carried out except that 330 g of a methanol sol of tin oxide coated with particles of a tungstic oxide-stannic oxide composite as disclosed in JP-A-3-217230, was used instead of the modified sol of Example 1.

COMPARATIVE EXAMPLE 2

The sol obtained in step (d) of A-1 was concentrated to about 10 wt % by ultrafiltration. To 1,000 g of the obtained sol, 4.0 g of tartaric acid and 6.0 g of diisopropylamine were added with intense stirring, and the mixture was subjected to distillation of water under reduced pressure by a rotary evaporator at a liquid temperature of at most 30° C., while gradually adding 20 l of methanol, to obtain 330 g of a methanol sol of a titanium oxide-stannic oxide-zirconium oxide composite, having water in the aqueous sol replaced with methanol. This sol had a specific gravity of 1.098, a pH of 7.47 (mixture with water in an equal weight), a viscosity of 2.7 c.p., a concentration of 30 wt % as calculated as total metal oxides, a water content of 0.60 wt %, and particle diameters of from 4 to 8 nm as observed by an electron microscope. This sol showed a colloidal color and had a high transparency, and it was free from e.g. precipitates, white turbidity and thickening and was stable, even after left to stand at room temperature for 3 months. Further, the dried product of this sol had a refractive index of 1.85.

COMPARATIVE EXAMPLE 3

In Comparative Example 3, a methanol sol of titanium oxide used in Comparative Examples of the present invention, was prepared.

587.5 g (159.8 g as $TiO_2$) of titanium tetrachloride (manufactured by Sumitomo Sitix Corporation, containing 27.2 wt % as $TiO_2$ and 32.0 wt % as Cl) and 2,608.5 g of water were introduced into a jacketed separable flask of 3 l made of glass to prepare 3,196 g of an aqueous titanium chloride solution (containing 5.0 wt % as $TiO_2$). To this aqueous solution, 50 g of 28% aqueous ammonia was added with stirring with a glass stirring rod, followed by hydrolysis at 95° C. for 10 hours to obtain agglomerates of colloidal particles of titanium oxide having primary particle diameters of from 4 to 8 nm.

The slurry of agglomerates of colloidal particles of titanium oxide was subjected to filtration under reduced pressure with a 5B filter paper, and an excess electrolyte was removed by washing with about 40 l of water to obtain 620 g of a wet cake of titanium oxide. The obtained wet cake was dispersed in 2,576 g of water, 8.0 g of isopropylamine was added thereto for alkalification, and the dispersion was passed through a column having 200 ml of an anion exchange resin (AMBERLITE IRA-410, manufactured by Organo Corporation) packed therein, to obtain 3,890 g of an aqueous alkaline sol of titanium oxide. This sol was concentrated under reduced pressure by a rotary evaporator to obtain 1,070 g of a concentrated aqueous alkaline sol of titanium oxide. To the obtained sol, 12.1 g of tartaric acid and 26.1 g of diisopropylamine were added with stirring, and the sol was subjected to distillation of water under reduced pressure by a rotary evaporator, while gradually adding 25 l of methanol, for replacement of the aqueous medium with methanol to prepare 775.2 g of a methanol sol of titanium oxide. The obtained methanol sol had a specific gravity of 0.970, a viscosity of 4.5 mPa·s, a pH (1+1) of 8.98, an electrical conductance of 1,600 μs/cm, a $TiO_2$ concentration of 20.2 wt % and a water content of 3.4 wt %.

Test on Light Resistance/Color Change of Sols (I)

The modified metal oxide sols obtained in Examples 1 to 12 showed an extremely pale colloidal color in a state of a sol, but did not show a colloidal color and were transparent and colorless after dried on a glass plate.

The sols obtained in Examples 1 to 12 and Comparative Examples 1 and 2 were, respectively, coated into thin films on a glass plate by an applicator, followed by drying at 150° C., and the thin films were irradiated with ultraviolet rays by a UV irradiation equipment OHD-320CM (manufactured by Oak Co., Ltd.) for 1 hour to examine the light resistance. The change in color of the coating films before and after the irradiation was visually observed to evaluate the light resistance. Rank (a) indicates that the change was small, and rank (b) indicates that the change was greater than the change of rank (a).

Preparation Of Coating Liquids (I)

36.8 parts by weight of 0.01N hydrochloric acid was dropwise added to 105.3 parts by weight of γ-glycidoxypropyl trimethoxysilane, followed by stirring for 24 hours to prepare a hydrolyzate of γ-glycidoxypropyl trimethoxysilane. To this hydrolyzate, 192.3 parts by weight of the modified metal oxide sols obtained in Examples 1 to 7, 9 and 11 and Comparative Examples 1 and 2, 290.0 parts by weight of the modified metal oxide sol obtained in Example 8, and 232 parts by weight of the modified metal oxide sols obtained in Examples 10 and 12, were, respectively, added to prepare 14 kinds of coating liquids.

Formation of Cured Films (I)

Coating compositions were coated on a commercially available polycarbonate plate having a refractive index nD=1.59 by dip coating, followed by heat treatment at 120° C. for 2 hours to cure the coating films.

Test on Moisture/Water Resistance (I)

The above cured coating films were immersed in warm water of 60° C. for 1 hour, then they were taken out and water was adequately wiped off, and the coating films were rubbed with a steel wool a few times. The states of the coating films were visually observed to evaluate the moisture/water resistance in accordance with the evaluation standards (a), (b), (c) and (d), wherein (a) designates no substantial scratch marks observed, and in the order of (b), (c) and (d), the degree of scratch marks increased.

TABLE 1

| Example | Light resistance | Moisture/water resistance |
| --- | --- | --- |
| Example 1 | a | a |
| Example 2 | a | a |
| Example 3 | a | a–b |
| Example 4 | a | a |
| Example 5 | a | a |
| Example 6 | a | a |
| Example 7 | a | a–b |
| Example 8 | a | a |
| Example 9 | a | a |
| Example 10 | a | a |
| Example 11 | a | a |
| Example 12 | a | a |
| Comparative Example 1 | b | c |
| Comparative Example 2 | a–b | a–b |

With respect to the water resistance, it is evident from the evaluation that the sol of a titanium oxide-stannic oxide-zirconium oxide composite of Comparative Example 2 is better than the modified stannic oxide sol of Comparative Example 1, and the modified metal oxide sols of Examples 1 to 12 are still better.

Likewise, with respect to the light resistance, it is evident that the sol of a titanium oxide-stannic oxide-zirconium oxide composite of Comparative Example 2 is better than the modified stannic oxide sol of Comparative Example 1, and the modified metal oxide sols of Examples 1 to 12 are still better.

Preparation of A Coating Liquids (II)

COMPOSITION EXAMPLE 1

Into a glass container equipped with a magnetic stirrer, 105.3 parts by weight of γ-glycidoxypropyl trimethoxysilane corresponding to the above component (A) was introduced, and 36.8 parts by weight of 0.01N hydrochloric acid was dropwise added thereto over a period of 3 hours with stirring. After completion of the dropwise addition, stirring was continued further for 0.5 hour, to obtain a partial hydrolyzate of γ-glycidoxypropyl trimethoxysilane. Then, 397.8 parts by weight of a methanol sol (containing 30.5 wt % as calculated as total metal oxides) of a modified titanium oxide-zirconium oxide-tin oxide composite coated with diantimony pentoxide containing an alkylamine obtained in Example 1, 65 parts by weight of butyl cellosolve and as a curing agent, 4.2 parts by weight of aluminum acetylacetonate, were added to 142.1 parts by weight of the above partial hydrolyzate of γ-glycidoxypropyl trimethoxysilane, and the mixture was thoroughly stirred, followed by filtration, to prepare a coating liquid.

Preparation of a Cured Film (II)

The above coating composition was coated on a commercially available polycarbonate plate having a refractive index $n_D$=1.59 by spin coating, followed by heat treatment at 120° C. for 2 hours to cure the coating film. The results of the evaluations are shown in Table 2.

COMPOSITION EXAMPLE 2

The same operation as in Composition Example 1 was carried out except that 397.8 parts by weight of a methanol sol (containing 30.5 wt % as calculated as total metal oxides) of a modified titanium oxide-zirconium oxide-tin oxide composite coated with diantimony pentoxide containing an alkylamine of Example 2 was used instead of the methanol sol of a modified titanium oxide-zirconium oxide-tin oxide composite coated with diantimony pentoxide containing an alkylamine of Example 1 used in Composition Example 1. The results of the evaluations are shown in Table 2.

COMPOSITION EXAMPLE 3

The same operation as in Composition Example 1 was carried out except that 397.8 parts by weight of a methanol sol (containing 30.5 wt % as calculated as total metal oxides) of a modified titanium oxide-zirconium oxide-tin oxide composite coated with diantimony pentoxide containing an alkylamine of Example 3 was used instead of the methanol sol of a modified titanium oxide-zirconium oxide-tin oxide composite coated with diantimony pentoxide containing an alkylamine of Example 1 used in Composition Example 1. The results of the evaluations are shown in Table 2.

COMPOSITION EXAMPLE 4

The same operation as in Composition Example 1 was carried out except that 22.3 parts by weight of tetraethoxysilane and 77.9 parts by weight of γ-glycidoxypropylmethyl diethoxysilane, each corresponding to component (A), were used instead of γ-glycidoxypropyl trimethoxysilane corresponding to component (A) used in Composition Example 1, and 2.6 parts by weight of aluminum acetylacetonate as a curing agent and 0.5 part by weight of ammonium perchlorate were used. The results of the evaluations are shown in Table 2.

COMPOSITION EXAMPLE 5

The same operation as in Composition Example 2 was carried out except that 74.2 parts by weight of γ-glycidoxypropyl trimethoxysilane and 31.1 parts by weight of γ-glycidoxypropylmethyl dimethoxysilane, each corresponding to component (A), were used instead of γ-glycidoxypropyl trimethoxysilane corresponding to component A. The results of the evaluations are shown in Table 2.

COMPOSITION EXAMPLE 6

The same operation as in Composition Example 3 was carried out except that 74.2 parts by weight of γ-glycidoxypropyl trimethoxysilane and 31.1 parts by weight of γ-glycidoxypropylmethyl dimethoxysilane, each corresponding to component (A), were used instead of γ-glycidoxypropyl trimethoxysilane corresponding to component A. The results of the evaluations are shown in Table 2.

COMPARATIVE COMPOSITION EXAMPLE 1

The same operation as in Composition Example 1 was carried out except that 643.6 parts by weight of the methanol sol of titanium oxide (containing 20.2 wt % as $TiO_2$) prepared in Comparative Example 3 was used instead of the sol used in Composition Example 1. The results of the evaluations are shown in Table 2.

COMPARATIVE COMPOSITION EXAMPLE 2

The same operation as in Composition Example 1 was carried out except that 433.3 parts by weight of a methanol sol of tin oxide coated with fine particles of a tungstic oxide-stannic oxide composite (containing 30.0 wt % as $SnO_2+WO_3$) as disclosed in JP-A-3-217230, was used instead of the sol used in Composition Example 1. The results of the evaluations are shown in Table 2.

COMPARATIVE COMPOSITION EXAMPLE 3

The same operation as in Composition Example 1 was carried out except that 433.3 parts by weight of a methanol sol of a titanium oxide-stannic oxide-zirconium oxide composite (containing 30.0 wt % as $TiO_2+SnO_2+ZrO_2$) as disclosed in JP-A-10-310429, was used instead of the sol used in Composition Example 1. The results of the evaluations are shown in Table 2.

COMPARATIVE COMPOSITION EXAMPLE 4

The same operation as in Composition Example 1 was carried out except that 650.0 parts by weight of colloidal silica (methanol sol, solid content: 20%, average particle diameter: 15 nm) was used instead of the sol used in Composition Example 1. The results of the evaluations are shown in Table 2.

Here, optical elements having a cured film, obtained in Composition Examples and Comparative Composition Examples, were subjected to the following tests to evaluate various physical properties.

(1) Scratch Resistance Test

The surface of each cured film was rubbed with a steel wool #0000, whereupon scratch resistance was visually evaluated in accordance with the evaluation standards (A), (B) and (C), wherein (A) designates no substantial scratch marks observed, and in the order of (B) and (C), the degree of scratch marks increased.

(2) Test On Presence Or Absence Of Interference Fringes

The optical elements having a cured film were visually observed under a fluorescent lamp and evaluated in accordance with the evaluation standards (A), (B) and (C), wherein (A) designates no substantial interference fringes observed, and in the order of (B) and (C), the occurrence of interference fringes increased.

(3) Adhesion Test

Each cured film was scored with cross cut lines at spaces of 1 mm to define 100 sections, and an adhesive tape (Cellotape, tradename, manufactured by Nichiban K.K.) was firmly bonded to the cross scored portion. Then, the adhesive tape was peeled quickly, and the presence or absence of peeling of the cured film upon peeling off the adhesive tape was examined.

(4) Warm Water Resistance Test

Each optical element was immersed in a warm water of 80° C. for 2 hours, whereupon the optical element was subjected to the same adhesion test as described above.

(5) Transparency Test

Each optical element was visually examined under a fluorescent lamp in a dark room to see if there was any fogging on the cured film, in accordance with the evaluation standards (A), (B) and (C), wherein (A) designates substantially no fogging observed, and in the order of (B) and (C), the degree of fogging increased.

(6) Weather Resistance Test

Each optical element was subjected to outdoor exposure for 1 month, and the change in the appearance of the optical element after exposure was visually evaluated.

TABLE 2

| | Scratch resistance | Interference fringes | Adhesion | Warm water resistance | Transparency | Weather resistance |
|---|---|---|---|---|---|---|
| Composition Example 1 | A | A | Good | Good | A | Good |
| Composition Example 2 | A | A | Good | Good | A | Good |
| Composition Example 3 | A | A | Good | Good | A | Good |
| Composition Example 4 | A | A | Good | Good | A | Good |
| Composition Example 5 | A | A | Good | Good | A | Good |
| Composition Example 6 | A | A | Good | Good | A | Good |
| Comparative Composition Example 1 | B | A | Good | Peeled | B | Blued |
| Comparative Composition Example 2 | B | A | Good | Partly peeled | A | Slightly yellowed |
| Comparative Composition Example 3 | A–B | A | Good | Good | A–B | Good |
| Comparative Composition Example 4 | A | C | Good | Good | A | Good |

The optical elements of Composition Examples 1 to 6 of the present invention were excellent in scratch resistance, absence of interference fringes, adhesion, warm water resistance, transparency and weather resistance. However, the optical elements of comparative Composition Examples 1 and 2 were insufficient in view of scratch resistance, warm water resistance, transparency and weather resistance, and the optical element of Comparative Composition Example 4 was unpreferred since interference fringes were observed. Further, the optical element of Comparative Composition Example 3 was not particularly inferior practically, but was slightly inferior to the optical elements of Composition Examples 1 to 6.

According to the present invention, by an effect of a coating material consisting of an alkali antimonate or a diantimony pentoxide colloid containing an alkali component, or a coating material having a silica component further added thereto, various drawbacks (in dispersibility, weather resistance, moisture resistance, long-term stability and compatibility with a hard coating agent) of a conventional metal oxide colloid, can be overcome, and an excellent modified metal oxide sol will be obtained.

When the modified metal oxide sol of the present invention is used as a component for a hard coating agent, problems of a conventional metal oxide sol, such as yellowing due to irradiation with ultraviolet rays, poor water resistance, poor moisture resistance and poor compatibility, will be overcome.

It is an object of the present invention to provide a stable sol of colloidal particles of a modified metal oxide, which is excellent in water resistance, moisture resistance and weather resistance, and which is useful as mixed with a hard coating agent as a component for improving properties of a hard coating film to be provided on the surface of plastic lenses.

The sol of colloidal particles of a surface-modified metal oxide obtained by the present invention, is transparent and colorless, provides a dried coating film with a refractive index of from about 1.80 to about 1.95, has high bonding strength and hardness, and is excellent in e.g. weather resistance, antistatic property, heat resistance and abrasion resistance. Further, it has exceptionally improved weather resistance and moisture resistance as compared with a conventional one.

This sol is stable at a pH of from about 2 to about 9, and has a sufficient stability to be provided as industrial products.

As the colloidal particles of this sol are negatively charged, the sol has a good compatibility with another sol of negatively charged colloidal particles, and can be stably mixed with e.g. a silica sol, a diantimony pentoxide sol, an anionic or nonionic surface active agent, an aqueous solution of e.g. polyvinyl alcohol, an anionic or nonionic resin emulsion, water glass, an aqueous solution of e.g. aluminum phosphate, a hydrolyzate of ethyl silicate, or a silane coupling agent such as γ-glycidoxy trimethoxysilane or its hydrolyzate.

The sol of the present invention having such a nature, is useful particularly as a component for improving the refractive index, dyability, chemical resistance, water resistance, moisture resistance, light resistance, weather resistance, abrasive resistance, etc. for forming a hard coating film on the surface of a plastic lens. In addition, it can be used for various applications.

A cured film obtained by the coating composition of the present invention will make a coating layer having improved scratch resistance, surface hardness, abrasion resistance, transparency, heat resistance, light resistance, weather resistance and particularly water resistance. Further, such a coating layer has excellent adhesive properties with an antireflection film (of e.g. an inorganic oxide or a fluorinated compound) or a metal vapor-deposited film, formed thereon.

The optical element of the present invention is excellent in scratch resistance, surface hardness, abrasion resistance, transparency, heat resistance, light resistance, weather resistance and particularly water resistance, and further presents an optical element having excellent appearance and high transparency, which is free from interference fringes even when a cured film is formed on a substrate having a high refractive index of at least 1.54.

The optical element having a cured film made of the coating composition of the present invention, is useful for not only lenses for eyeglasses, but also lenses for cameras, window glasses for automobiles and optical filters used for liquid crystal display or plasma display devices.

Further, by applying the sol of the present invention to the surface of e.g. organic fibers, textile products or paper, the flame resistance, anti-slip properties, antistatic properties, dyability, etc., of such materials, can be improved. Further, the sol is useful as a binding agent for e.g. ceramic fibers, glass fibers and ceramics. Further, by mixing the sol with e.g. a coating agent or an adhesive, the water resistance, chemical resistance, light resistance, weather resistance, abrasion resistance, flame resistance, etc., of a cured coating film of the coating agent or the adhesive, will be improved. Further, the sol is useful commonly as a surface treating agent for e.g. metal materials, ceramic materials, glass materials and plastic materials. Further, it is useful also as a catalyst component.

The invention claimed is:

1. An optical element which comprises an optical substrate and a cured film made of a coating composition formed on the surface of the optical substrate, wherein the coating composition comprises the following components (A) and (B):

component (A): at least one silicon-containing substance selected from the group consisting of organic silicon compounds of formula (I):

$(R^1)_a(R^3)_b Si(OR^2)_{4-(a+b)}$ (I)

wherein each of $R^1$ and $R^3$ is an alkyl group, an aryl group, a halogenated alkyl group, a halogenated aryl group, an alkenyl group, or an organic group having an epoxy group, an acryloyl group, a methacryloyl group, a mercapto group, an amino group or a cyano group, which is bonded to the silicon atom by a Si-C bond, $R^2$ is a $C_{1-8}$ alkyl group, an alkoxyalkyl group or an acyl group, and each of a and b is an integer of 0, 1 or 2, provided that a+b is an integer of 0, 1 or 2, and the formula (II):

$[(R^4)_c Si(OX)_{3-c}]_2 Y$ (II)

wherein $R^4$ is a $C_{1-5}$ alkyl group, X is a $C_{1-4}$ alkyl group or an acyl group, Y is a methylene group or a $C_{2-20}$ alkylene group, and c is an integer of 0 or 1, and their hydrolyzates; and component (B): colloidal particles of a modified metal oxide which have primary particle diameters of from 2 to 100 nm and which contain particles (c) comprising colloidal particles (a) of a metal oxide having primary particle diameters of from 2 to 60 nm, selected from the group consisting of $Fe_2O_3$ particles, CuO particles, ZnO particles, $Y_2O_3$ particles, $ZrO_2$ particles, $Nb_2O_5$ particles, $MoO_3$ particles, $In_2O_3$ particles, $SnO_2$ particles, $Ta_2O_5$ particles, $WO_3$ particles, PbO particles, $Bi_2O_3$ particles, $SnO_2$—$WO_3$ composite particles, $SnO_2$—$ZrO_2$ composite particles, $TiO_2$—$ZrO_2$—$SnO_2$ composite particles, $ZnSb_2O_6$ particles, $InSbO_4$ particles, $ZnSnO_3$ particles and combinations thereof, as nuclei, and a coating material (b) comprising alkali component-containing diantimony pentoxide colloidal particles having a $M/Sb_2O_5$ molar ratio, where M is an alkali metal, ammonium, a quaternary ammonium or an amine, of from 0.02 to 4.00, coated on the surface of the particles (a).

2. The optical element according to claim 1, wherein the component (A) is at least one silicon-containing substance selected from the group consisting of the organic silicon compounds of the formula (I) and their hydrolyzates.

3. The optical element according to claim 1, wherein M is an alkylamine.

4. The optical element according to claim 1, wherein the coating material (b) of the component (B) further contains an alkylamine-containing silica.

5. The optical element according to claim 1, wherein the coating composition contains at least one curing catalyst selected from the group consisting of metal salts, metal alkoxides and metal chelates.

6. The optical element according to claim 1, which further has an antireflection film formed on its surface.

* * * * *